W. G. PATRIDIS.
MEASURING DEVICE.
APPLICATION FILED MAY 7, 1918.
1,293,531.
Patented Feb. 4, 1919.
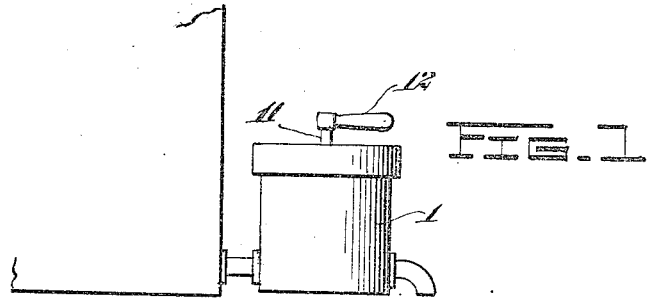
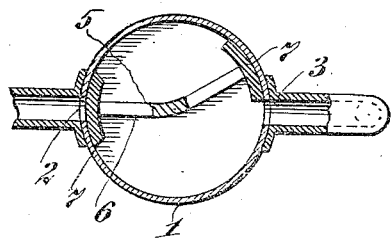
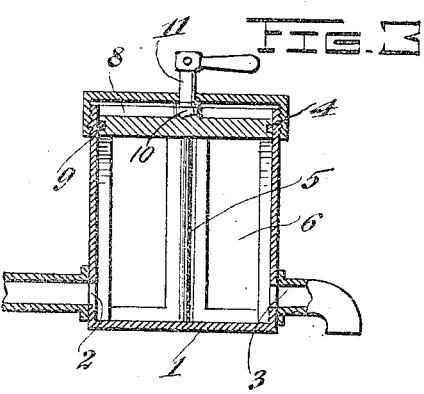
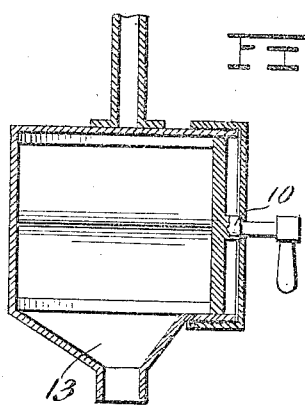
Witnesses
Inventor
William G. Patridis.
By Victor J. Evans
Attorney

UNITED STATES PATENT OFFICE.

WILLIAM G. PATRIDIS, OF PITTSBURGH, PENNSYLVANIA.

MEASURING DEVICE.

1,293,531.  Specification of Letters Patent.  Patented Feb. 4, 1919.

Application filed May 7, 1918. Serial No. 233,099.

*To all whom it may concern:*

Be it known that I, WILLIAM G. PATRIDIS, a subject of Greece, residing at Pittsburgh, in the county of Allegheny and State of Pennsylvania, have invented new and useful Improvements in Measuring Devices, of which the following is a specification.

This invention relates to a measuring device and has for its primary object to provide a device of this character by means of which the amount of material passing therethrough may be accurately measured.

An object of the invention is to provide a simple device for dispensing predetermined quantities of material either in the liquid form or granulated form.

With these and other objects in view the invention will be better understood from the following detailed description taken in connection with the accompanying drawing wherein:

Figure 1 is a side elevation of the device shown connected to a receptacle.

Fig. 2 is a horizontal sectional view.

Fig. 3 is a vertical sectional view.

Fig. 4 is a horizontal sectional view through a slight modified form of the invention.

At the start I wish to call attention to the fact that throughout the specification where the word fluid is used it is to be understood that the same includes any material that will flow, whether liquid or granulated material.

One form of my invention for accomplishing the foregoing objects consists of a cylindrical casing 1 provided with an inlet 2 and an outlet 3 communicating with the usual pipe sections. This casing is provided with a rotatable cap 4 for a purpose hereinafter described. Mounted within the casing for rotation is a partition 5 shown in this particular instance as formed with openings 6 so that the interior of the casing to each side of the partition will at all times be in communication with each other so that the casing may be completely filled with the fluid. At this point I wish to call attention to the fact that the partition may be solid so as to divide the interior of the casing into two compartments of different capacity so that two different quantities of material may be measured with a single device. The vertical edges of the partition are provided with flanges 7 so disposed that when one is closing the inlet 2 the other will be moved to a position to uncover the outlet 3; thus it will be seen that upon slight rotation of the partition the inlet and outlet may be alternately closed thereby measuring and passing a predetermined amount of fluid from any suitable receptacle to any suitable receiver.

In some uses of the device it is absolutely necessary that the interior capacity of the casing receiving the fluid should be accurately regulated and to assure this result the partition is divided with a disk shaped bearing 8 engaging the interior of the cylinder and having arranged therein a packing ring 9 with a result that the fluid is prevented from passing over the disk 8 and therefore the space below the disk that receives the fluid may be accurately kept at the required capacity. This bearing 8 is provided with a boss 10 engaged by the cap 4 with a result that upon screwing up on the cap 4 the tightness of fit between the partition and casing may be accurately regulated so as to insure the proper connection at all times. Projecting from the boss 10 is a rod 11 to which is connected a handle 12 for rotating the partition.

In Fig. 4 I have shown a slight modification of my invention in which the parts are identical with that just described with the exception that the outlet 13 is flared for a part of its length so that granulated material passing through the device cannot accumulate within the device in its passage therethrough. In this particular instance the partition will be solid so as to facilitate the forementioned action.

From the foregoing description taken in connection with the accompanying drawing it should be apparent that I provide a simple device for accurately measuring the passing fluid from the container to a receiver and in which the parts are so associated and constructed that by simple mechanical changes the device may be made to accomplish various other results than can be accomplished by the device as constructed in the drawing and therefore I do not desire to be limited in these particulars or in any others, except as set forth in the appended claims.

Having described my invention, what I claim is:—

1. A measuring device comprising a casing having an inlet and an outlet, and a partition provided with openings and flanged extremities adapted to alternately close said inlet and outlet said partition being further provided with a disk shaped bearing engaging the interior surface of the casing and a cap threaded on the casing and engaging said bearing for preventing dislocation of the partition and a handle connected to the partition.

2. A measuring device comprising a casing having an inlet and an outlet and a movable partition provided with openings and flanged extremities adapted to alternately close said inlet and outlet, said partition being further provided with a solid disk shaped bearing having its peripheral surface in slidable engagement with the interior surface of the casing and a cap threaded on the casing and engaging said bearing for restricting the distance between the bottom of the casing and said bearing.

3. A measuring device comprising a casing having an inlet and an outlet and a movable partition provided with openings and flanged extremities adapted to alternately close said inlet and outlet, said partition being further provided with a solid disk shaped bearing having its peripheral surface in slidable engagement with the interior surface of the casing and a cap threaded on the casing and engaging said bearing for restricting the distance between the bottom of the casing and said bearing, and a packing ring arranged in the peripheral surface of said bearing.

In testimony whereof I affix my signature.

WILLIAM G. PATRIDIS.

Copies of this patent may be obtained for five cents each, by addressing the "Commissioner of Patents Washington, D. C."